United States Patent

Paknad et al.

[11] Patent Number: 5,832,530
[45] Date of Patent: Nov. 3, 1998

[54] METHOD AND APPARATUS FOR IDENTIFYING WORDS DESCRIBED IN A PORTABLE ELECTRONIC DOCUMENT

[75] Inventors: Mohammad Daryoush Paknad; Robert M. Ayers, both of Palo Alto, Calif.

[73] Assignee: Adobe Systems Incorporated, San Jose, Calif.

[21] Appl. No.: 884,003

[22] Filed: Jun. 27, 1997

Related U.S. Application Data

[63] Continuation of Ser. No. 304,678, Sep. 12, 1994, abandoned.

[51] Int. Cl.⁶ ................................................ G06F 15/00
[52] U.S. Cl. ................................................ 707/500
[58] Field of Search ...................... 707/500, 530

[56] References Cited

U.S. PATENT DOCUMENTS

| | | | |
|---|---|---|---|
| 4,741,045 | 4/1988 | Denning | 382/178 |
| 5,003,614 | 3/1991 | Tanaka et al. | 382/171 |
| 5,161,245 | 11/1992 | Fenwick | 382/231 |
| 5,167,016 | 11/1992 | Bagley et al. | 395/144 |
| 5,224,040 | 6/1993 | Tou | 364/419 |
| 5,265,171 | 11/1993 | Sangu | 382/177 |
| 5,278,918 | 1/1994 | Bernzott et al. | 382/176 |
| 5,321,770 | 6/1994 | Huttenlocher et al. | 382/174 |
| 5,325,444 | 6/1994 | Cass et al. | 382/177 |
| 5,359,673 | 10/1994 | De La Beaujardiere | 382/229 |
| 5,369,714 | 11/1994 | Withgott et al. | 382/177 |
| 5,384,864 | 1/1995 | Spitz | 382/174 |
| 5,390,259 | 2/1995 | Withgott et al. | 382/177 |
| 5,410,611 | 4/1995 | Huttenlocher et al. | 382/177 |
| 5,438,630 | 8/1995 | Chen et al. | 382/159 |
| 5,455,871 | 10/1995 | Bloomberg et al. | 382/173 |
| 5,465,309 | 11/1995 | Motoyama et al. | 395/144 |
| 5,483,629 | 1/1996 | Johnson | 382/229 |
| 5,483,653 | 1/1996 | Furman | 395/650 |
| 5,488,719 | 1/1996 | Kaplan et al. | 395/600 |
| 5,491,760 | 2/1996 | Withgott et al. | 382/203 |
| 5,493,634 | 2/1996 | Bonk et al. | 395/101 |
| 5,504,843 | 4/1996 | Catapano et al. | 395/115 |
| 5,504,891 | 4/1996 | Motoyama et al. | 395/600 |
| 5,506,985 | 4/1996 | Motoyama et al. | 395/600 |
| 5,513,311 | 4/1996 | McKiel Jr. | 395/161 |
| 5,539,841 | 7/1996 | Huttenlocher et al. | 382/218 |

FOREIGN PATENT DOCUMENTS

| | | |
|---|---|---|
| 0 544 431 A2 | 6/1993 | European Pat. Off. . |
| 61-243531 | 10/1986 | Japan . |

OTHER PUBLICATIONS

Lang, "About GSview", GSview.exe help file, Jan. 1997.
Birrell et al., "The *ps to text* program", http://www.research.digital.com/SRC/virtualpaper/pstotext.html, Oct. 29, 1996.

(List continued on next page.)

*Primary Examiner*—Joseph R. Burwell
*Attorney, Agent, or Firm*—Fish & Richardson

[57] ABSTRACT

A method and apparatus for identifying words stored in a portable electronic document. A digital computation apparatus stores a page of a document including characters in text segments that have not been identified as words. A word identifying mechanism analyzes the text segments of the page and stores the text segments as text objects in a linked list. The word identifying mechanism identifies words from the text objects in the linked list by analyzing the text objects for word breaks and by analyzing gaps between text objects using position data associated with the text segments. The identified words are stored in a word list and are sorted if necessary. A method of the present invention receives a text segment from a page of a document having multiple text segments and associated position data, including x and y coordinates for each text segment. A text object is created for each text segment, and the text objects are entered into a linked list. Words are then identified from the linked list by analyzing the text objects for word breaks and by analyzing gaps between text objects using the associated position data. Words that are identified in the text objects are added to a word list. The above steps are repeated until the end of the page is reached. The method and apparatus can be used for searching for words in a portable electronic document.

22 Claims, 12 Drawing Sheets

OTHER PUBLICATIONS

Birrell et al., "*ps to text*", man page documentation, http://www.research.digital.com/SRC/virtualpaper/manpages/pstotext.1.html, Oct. 29, 1996.

R. Skinner, "Cross–Platform Formatting Programs," *Library Software Review,* Summer, 1994, vol. 13, n. 2, pp. 152–156.

IBM Technical Disclosure Bulletin, vol. 37, No. 5, May 1, 1994, pp. 163–166, "Generating Words from Characters using an Adoptive 'Learning' Algorithm".

Lau, "Building a Hypermedia Information System on the Internet", IPCC '94—Scaling New Heights in Technical Commnication, Sep. 28, 1994, pp. 192–197.

*Figure 2a* foo bar — 40

42
48 → ⋮
   <FONT, SIZE, OTHER INFO> — 50
   20,30 Td
   (f) Tj ← 44
46  <FONT, SIZE, OTHER INFO>
   30,30 Td
   (oo) Tj — 50
   <FONT, SIZE, OTHER INFO>
48 → 70,30 Td
   (bar) Tj ← 44
46  <FONT, SIZE, OTHER INFO>
   ⋮

*Figure 3a*

Hello
World ← 52

54
48' ⋮  50'   <FONT, OTHER INFO>
<FONT, OTHER INFO> → 30,50 Td — 50'
50,50 Td       (He) Tj
(llo) Tj    48'  <FONT, OTHER INFO>
46 <FONT, OTHER INFO>  30,30 Td
60,30 Td        (Wo) Tj ← 44'
(rld) Tj ← 44'   46'
            ⋮

*Figure 9a*
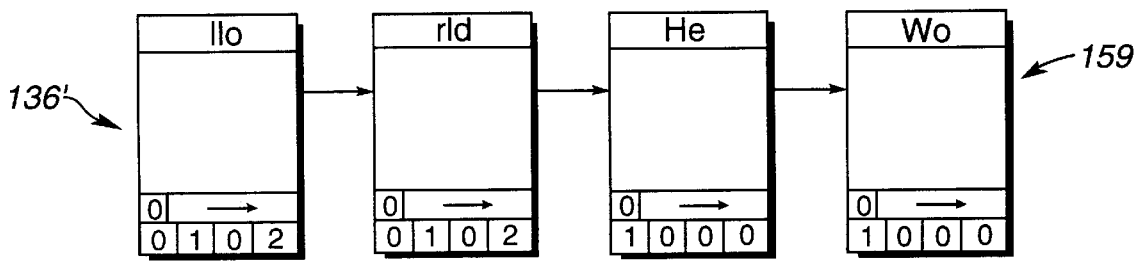
*Figure 9b*
*Figure 10a*
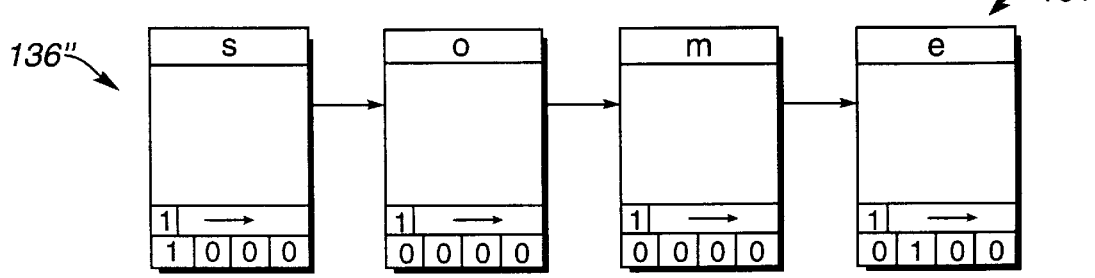
*Figure 10b*

METHOD AND APPARATUS FOR IDENTIFYING WORDS DESCRIBED IN A PORTABLE ELECTRONIC DOCUMENT

This is a continuation of application Ser. No. 08/304,678, filed Sep. 12, 1994, now abandoned.

CROSS REFERENCE TO RELATED APPLICATIONS

Patent application Ser. No. 08/304,762, filed Sep. 12, 1994, abandoned, now Ser. No. 08/884,004, filed Jun. 27, 1997, and under obligation of assignment to a common assignee, by inventor Robert M. Ayers, entitled, "Method and Apparatus for Identifying Words Described in a Page Description File", is related to the present application and is incorporated by reference herein.

BACKGROUND OF THE INVENTION

The present invention relates generally to the processing of digitally-stored objects, and more particularly to a method and apparatus for identifying words from coded objects in a display file.

Characters, words, and other objects can be efficiently stored in files as high level codes, where each code represents an object. The characters or other object codes can be displayed, edited, or otherwise manipulated using an application software program running on the computer. When displaying the characters with an output device such as a printer or display screen, the character codes can be rendered into bitmaps and/or pixel maps and displayed as a number of pixels. A pixel is a fundamental picture element of an image, and a bitmap is a data structure There are several ways to display a coded object. A raster output device, such as a laser printer or computer monitor, typically requires a bitmap of the coded object which can be inserted into a pixel map for display on a printer or display screen. A raster output device creates an image by displaying the array of pixels arranged in rows and columns from the pixel map. One way to provide the bitmap of the coded object is to store an output bitmap in memory for each possible code. For example, for codes that represent characters in fonts, a bitmap can be associated with each character in the font and for each size of the font that might be needed. The character codes and font size are used to access the bitmaps. However, this method is very inefficient in that it tends to require a large amount of peripheral and main storage. Another method is to use a "character outline" associated with each character code and to render a bitmap of a character from the character outline and other character information, such as font and size. The character outline can specify the shape of the character and requires much less memory storage space than the multitude of bitmaps representing many sizes. The characters can thus be stored in a page description file which contains the character codes, font information, size information, etc. Page description languages used to render bitmaps from character outlines include the Portable Document Format (PDF) language and the PostScript® language, both by Adobe Systems, Inc. of Mountain View, Calif. Character outlines can be described in standard formats, such as the Type 1® format by Adobe Systems, Inc.

Portable electronic documents, such as documents stored in the PDF language, are designed to be displayed and viewed with the appearance with which they were created, regardless of the hardware and/or software platform which is used to view or manipulate the document. Application programs have been developed to create such portable documents. For example, Acrobat™, developed by Adobe Systems, Inc., is an application program that can be used on several different computer platforms. An Acrobat program on one platform can create, display, edit, print, annotate, etc. a PDF document produced by another Acrobat program running on a different platform, regardless of the type of computer platform used. A document in a certain format or language can also be translated into a PDF document using Acrobat. For example, a PostScript file can be translated into a PDF document with no loss of displayed information such as graphics and text.

Finding word objects in a document or file that has been formatted as a portable electronic document can be difficult due to the diverse methods used to store the codes in the file. For example, application programs can generate a portable electronic document having a page full of characters or strings of characters. However, the order of the character strings stored in the document does not necessarily equate with the order of the character strings as displayed on the page. For example, each character string can have a set of coordinates associated with it to provide the position on the page where the string is to be displayed. Since the output device displays the string based upon its coordinates, the strings do not have to be stored sequentially. Since characters or strings which comprise a word might each be scattered within the document, it is difficult to search for, or even identify, a word from such documents.

Another problem in distinguishing words in a portable electronic document occurs when different characters of the word have different characteristics. For example, the characters in a word might each be "rotated", i.e., angled relative to the horizontal, when displayed on a page. If only character characteristics such as coordinate locations are used to determine which characters are in a word, then a word having such rotated characters would not be identified as a whole word.

SUMMARY OF THE INVENTION

The present invention provides a method and apparatus for identifying words stored in a portable electronic document, such as a document produced by the aforementioned Acrobat™ program. The present invention can identify words from scattered text segments, rotated text segments, and spaced apart text segments stored in the document.

The apparatus of the present invention includes a system for identifying words in a page of a document described in a portable electronic document. A digital computation apparatus stores a page of the document, where each text segment preferably has an associated x coordinate and y coordinate which indicate where the text segment is to be displayed on a displayed page. The page includes text segments of one or more characters that have not been identified as words. A word identifying mechanism analyzes the characters of the page to create a word list of words identified on the page. A mechanism for identifying scattered documents further determines whether the page requires sorting so that words are identified correctly.

A text segment and associated information for the text segment are read from the page by the word identifying mechanism and stored as a text object in a linked list. The word identifying mechanism identifies words from the text objects in the linked list and stores the words in the word list. A word is identified by finding a word break character in the text objects or by finding a gap having a size greater than a threshold size between adjacent text objects. The gap is detected by analyzing the spacial distance between adjacent text objects using the coordinates of the text segments in the text objects. At least portions of adjacent text objects are added as a word to the word list by the word identifying mechanism when the gap between the adjacent text objects is below the threshold size. In addition, at least portions of adjacent rotated text objects are added as a word to the word list by the word identifying mechanism when bounding boxes of the text objects intersect or are separated by a threshold gap distance. Furthermore, a sorting mechanism is included for sorting the word list if the scattered document identification mechanism determines that the page requires sorting. The sorting mechanism sorts the words in the word list first by the y coordinates and then by the x coordinates of the words in the word list. The word identifying mechanism rebuilds the word list by concatenating words in the word list which are positioned within a threshold distance of each other and words which include a hyphen character at the end of the word.

The present invention further includes a method for identifying words in a portable electronic document. A text segment is received from a page of a document having multiple text segments and associated position data, which includes x and y coordinates for each text segment. A text object is created for each text segment, and the text objects are entered into a linked list. Words are then identified from the linked list by analyzing the text objects for word breaks and by analyzing gaps between text objects using the associated position data. Words that are identified in the text objects are added to a word list. The above steps are repeated until the end of the page is reached.

The text segments are preferably identified and the associated position data retrieved by interpreting commands of the portable electronic document by which the text segments are stored in the document. Re-encoded characters of the text segments are reassigned using a re-assignment table and then stored in the text object. A flow direction indicator is also preferably stored in the text objects. The word is identified from the text objects by finding a word break character in a text object or by finding a gap having a size greater than a threshold size between adjacent text objects. When the gap between adjacent text objects is found to be less than a threshold size, then at least portions of the adjacent text objects are identified as a word and added to the word list. The word list of identified words is preferably sorted if the page of the document is considered to be scattered; the words are sorted first by their y coordinates and then by their x coordinates. Words in the word list which are positioned within a threshold distance of each other, or words which include a hyphen character at the end of the word, are concatenated to rebuild the word list.

In yet another aspect of the present invention, software is provided for finding words in a file. The file includes multiple text segments of one or more characters and page description language commands. A text segment retriever retrieves text segments from the file, preferably by analyzing the commands in the file to identify the text segments. A list builder builds a list of text objects for the text segments. A word break analyzer determines whether a word break is within a text object and places a word in a word list if a word break is found. The word break analyzer preferably finds word break characters, such as a space character or punctuation character. A gap analyzer determines if a gap between adjacent text objects meets proximity criteria for being a part of a word and places a word in the word list after the proximity criteria is not met. The gap analyzer preferably places the word in the word list using a start word pointer which points to a first character of a word in the text objects and an end word pointer which points to a last character of a word in the text objects.

An advantage of the present invention is that words are identified in a portable electronic document which may include text segments and characters stored in formats which are difficult to directly identify words. Portable electronic documents may store characters in a scattered fashion and often provide no space characters to divide words. The present invention sorts the characters according to their displayed order and positions and can provide the words to a requesting client process.

Another advantage of this invention is that words can be identified in a portable electronic document having a wide variety of different formats. For example, words having characters different fonts, size, position, and other display characteristics can be readily identified.

These and other advantages of the present invention will become apparent to those skilled in the art upon a reading of the following specification of the invention and a study of the several figures of the drawing.

BRIEF DESCRIPTION OF THE DRAWINGS

FIG. 2a is a diagrammatic illustration of a portion of a display screen showing displayed images from a portable electronic document;

FIG. 2b is a diagrammatic illustration of a portable electronic document which provided the images shown in FIG. 2a;

FIG. 3a is a diagrammatic illustration of a portion of a display screen showing displayed images derived from a scattered portable electronic document;

FIG. 3b is a diagrammatic illustration of a portable electronic document which provides images displayed on the screen of FIG. 3a;

FIG. 4b is a diagrammatic illustration of a portable electronic document which provides images displayed on the screen of FIG. 4a;

FIG. 9a is a diagrammatic illustration of the first text object in a linked list created for the portable electronic document shown in FIG. 3b;

FIG. 9b is a diagrammatic illustration of a linked list including the text objects derived from the portable electronic document shown in FIG. 3b;

FIG. 10a is a diagrammatic illustration of the first text object in the linked list created for the portable electronic document shown in FIG. 4b;

FIG. 10b is a diagrammatic illustration of a linked list including the text objects derived from the portable electronic document shown in FIG. 4b;

FIG. 12b is diagrammatic illustration of a portion of a display screen which shows images of the text objects of FIG. 12a;

DETAILED DESCRIPTION OF THE PREFERRED EMBODIMENT

The present invention is well-suited for identifying words in a portable electronic document that includes different types of character characteristics, spacing characteristics, and formatting variations. More particularly, a portable electronic document such as made by Acrobat™ of Adobe Systems, Inc. can be processed to identify words by the present invention. The present invention is suitable for providing words to a client application program which searches page description documents or provides distinct words or multiple words to a user.

A number of terms are used herein to describe images and related structures. "Pixel" refers to a single picture element of an image. Taken collectively, the pixels form the image. "Bitmap" refers to bits stored in digital memory in a data structure that represents the pixels. As used herein, "bitmap" can refer to both a data structure for outputting black and white pixels, where each pixel either is on or off, as well as a "pixel map" having more information for each pixel, such as for color or gray scale pixels. "Render" refers to the creation of a bitmap from an image description, such as a character outline. "Raster" refers to the arrangement of pixels on an output device that creates an image by displaying an array of pixels arranged in rows and columns. Raster output devices include laser printers, computer displays, video displays, LCD displays, etc. "Coded" data is represented by a "code" that is designed to be more concise and to be more readily manipulated in a computing device than raw data, in, for example, bitmap form. For example, the lowercase letter "a" can be represented as coded data, e.g., the number 97 in ASCII encoding.

Figure 1:
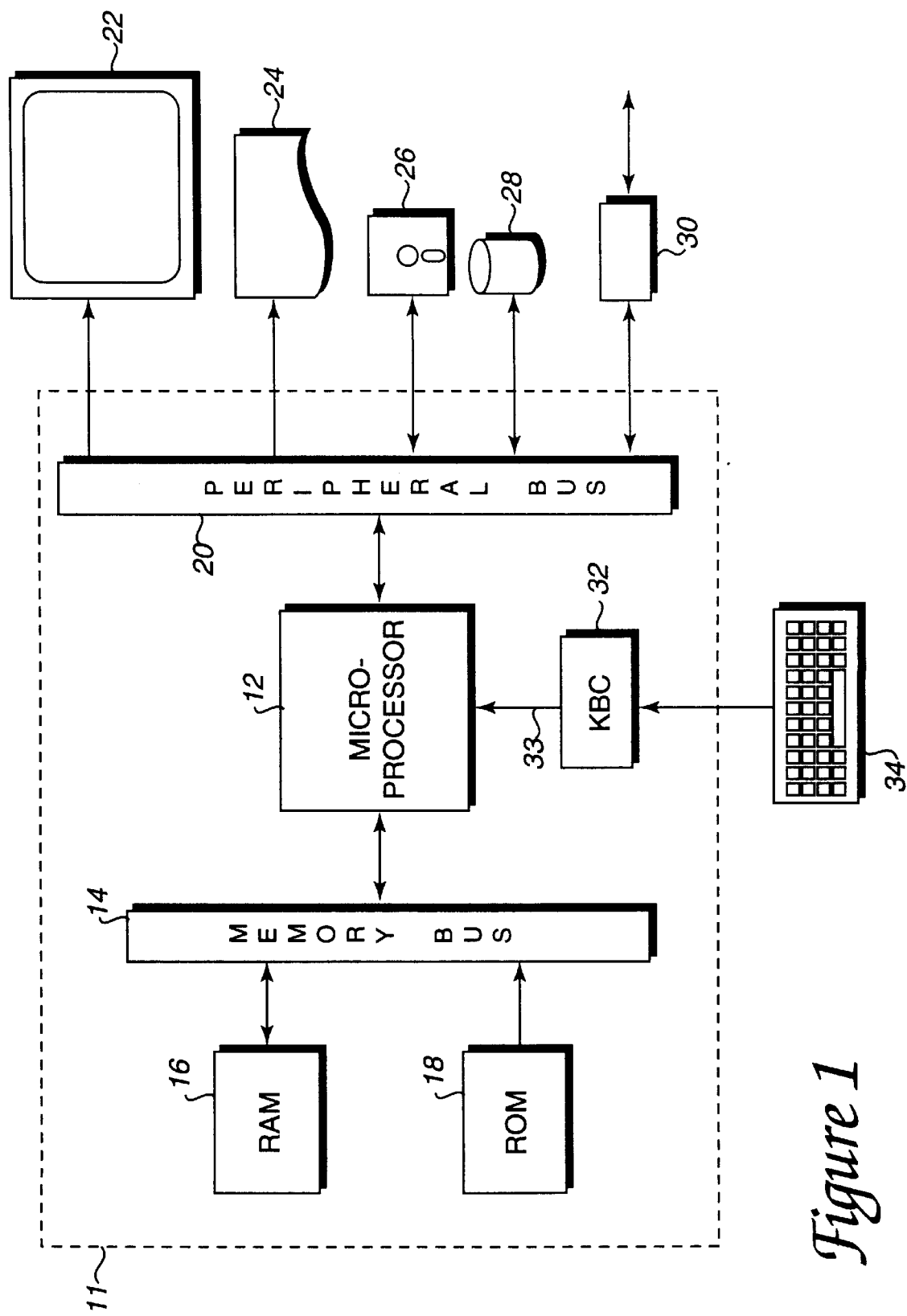
FIG. 1 is a block diagram of a computer system for identifying words in a portable electronic document in accordance with the present invention.

In FIG. 1, a computer system 10 for identifying words in a portable electronic document includes a digital computer 11, a display screen 22, a printer 24, a floppy disk drive 26, a hard disk drive 28, a network interface 30, and a keyboard 34. Digital computer 11 includes a microprocessor 12, a memory bus 14, random access memory (RAM) 16, read only memory (ROM) 18, a peripheral bus 20, and a keyboard controller 32. Digital computer 11 can be a personal computer (such as an IBM-PC AT-compatible personal computer), a workstation (such as a SUN or Hewlett-Packard workstation), etc.

Microprocessor 12 is a general purpose digital processor which controls the operation of computer system 10. Microprocessor 12 can be a single-chip processor or can be implemented with multiple components. Using instructions retrieved from memory, microprocessor 12 controls the reception and manipulation of input data and the output and display of data on output devices. In the described embodiment, a function of microprocessor 12 is to examine a coded file and detect objects within that file. The objects can be used, for example, by different application programs which are implemented by microprocessor 12 or other computer systems.

Memory bus 14 is used by microprocessor 12 to access RAM 16 and ROM 18. RAM 16 is used by microprocessor 12 as a general storage area and as scratch-pad memory, and can also be used to store input data and processed data. ROM 18 can be used to store instructions followed by microprocessor 12 as well as image descriptions and character outlines used to display images in a specific format. For example, input data from a file can be in the form of character codes, representing characters, a portable electronic document language such as the Portable Document Format™ (PDF™), or a page description language such as PostScript®. The characters' associated character outlines can be retrieved from ROM 18 when bitmaps of the characters are rendered to be displayed as rendered images by a raster output device. Alternatively, ROM 18 can be included in an output device, such as printer 24.

Peripheral bus 20 is used to access the input, output, and storage devices used by digital computer 11. In the described embodiment, these devices include display screen 22, printer device 24, floppy disk drive 26, hard disk drive 28, and network interface 30. Keyboard controller 32 is used to receive input from keyboard 34 and send decoded symbols for each pressed key to microprocessor 12 over bus 33.

Display screen 22 is an output device that displays images of data provided by microprocessor 12 via peripheral bus 20 or provided by other components in the computer system. In the described embodiment, display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen, or components of computer system 10 can first render codes or other image descriptions from a page description file into bitmaps and send those bitmaps to be displayed on display screen 24. Raster display screens such as CRT's, LCD displays, etc. are suitable for the present invention.

Printer device 24 provides an image of a bitmap on a sheet of paper or a similar surface. Printer 24 can be a laser printer, which, like display screen 22, is a raster device that displays pixels derived from bitmaps. Printer device 24 can print images derived from coded data such as found in a portable electronic document. Other output devices can be used as printer device 24, such as a plotter, typesetter, etc.

To display images on an output device, such as display screen 22 or printer 24, computer system 10 can implement one or more types of procedures. One procedure is to transform coded objects into image descriptions. For example, the code for a text character is a portion of an image description which takes up less memory space than several copies of the bitmap of the recognized character. The text character code can include associated information which specify how the character is to be displayed, such as positional coordinates, size, font, etc. A well known portable electronic document language for specifying image descriptions is the Portable Document Format (PDF) language by Adobe Systems, Inc. of Mountain View, Calif., which is used in the Acrobat™ application program. The image description can reference stored character outlines which describe the shape of the character and includes other rendering information. A well-known character outline format is the Type 1® format, by Adobe Systems. Using character outlines, computer system 10 can render a bitmap for each character and send the bitmap to a memory cache or other storage area that is accessible to an output device for display. In other embodiments, output devices such as printers can include microprocessors or similar controllers which can render a bitmap from character outlines. Herein, a "portable electronic document" is a file or similar storage unit which includes objects of an image description stored in a portable electronic document language such as PDF. A portable electronic document can include objects represented by a page description language, such as the PostScript language. A page description language file is thus considered a portable electronic document herein.

Floppy disk drive 26 and hard disk drive 28 can be used to store bitmaps, image descriptions (coded data), and character outlines, as well as other types of data. Floppy disk drive 26 facilitates transporting such data to other computer systems, and hard disk drive 28 permits fast access to large amounts of stored data such as bitmaps, which tend to require large amounts of storage space. Other mass storage units such as nonvolatile memory (e.g., flash memory), PC-data cards, or the like, can also be used to store data used by computer system 10.

Network interface 30 is used to send and receive data over a network connected to other computer systems. An interface card or similar device and appropriate software implemented by microprocessor 12 can be used to connect computer system 10 to an existing network and transfer data according to standard protocols.

Keyboard 34 is used by a user to input commands and other instructions to computer system 10. Images displayed on display screen 22 or accessible to computer system 10 can be edited, searched, or otherwise manipulated by the user by inputting instructions on keyboard 34. Other types of user input devices can also be used in conjunction with the present invention. For example, pointing devices such as a computer mouse, a track ball, a stylus, or a tablet can be used to manipulate a pointer on a screen of a general-purpose computer.

FIG. 2a is a diagrammatic illustration of a portion of a display screen 22 showing displayed images from a portable electronic document. A portable electronic document is a file or other collection of digital data which includes coded objects which have been stored in a portable electronic document language. Portable electronic document languages, such as PDF, can be used to store the identity of an object and related information associated with the object used to display the object. For example, a page of text characters or strings of characters can be stored in a PDF document as codes representing the identity of the characters, as well as the locations to display the characters, font information, size and orientations of the characters. Portable electronic documents, as defined herein, differ from normal ASCII text files, since ASCII text documents or files include only ASCII codes of characters and no other display information, and the characters are displayed in the sequence of the characters as stored in the file.

Referring to FIG. 2a, display screen 22 shows displayed images derived from a portable electronic document. Text image 40 is displayed on the screen from the codes, font information, size information, coordinate information, etc. stored in the portable electronic document, and are typically derived from rendered bitmaps as explained above with reference to FIG. 1. Text image 40 can also be displayed on a sheet of paper output by printer 24. The computer determines the font and size of each character or string to be displayed by examining the associated font, size, and other information in the PDF document.

FIG. 2b is a diagrammatic illustration of a portable electronic document 42 which provided the image 40 shown in FIG. 2a. A portable electronic document input to the present invention can have a wide variety of formats. Herein, a portable electronic document having data stored in the PDF language is referenced as the main example. Portable electronic documents having data stored in other languages, such as PostScript, can also be used in the present invention. Objects such as characters are stored as codes in PDF, where a display command 44, such as "Tj", is an instruction to the microprocessor to send a text segment 46 in the associated parentheses to an output device (or output storage cache) for display. Herein, a "text segment" is one or more characters (i.e., a string of characters) which are associated with a single display command. Text segment 46 associated with the display command is displayed at a location specified by coordinates 48 associated with each display command. Coordinates 48 typically include an x (horizontal) coordinate and a y (vertical) coordinate. Font, size, and other information 50 can also be associated with each display command 44 or text segment 46 in the PDF document to provide the display characteristics of the segments. For example, the font information includes information about which font the segments are to be displayed in, and may also include information concerning the re-mapping of a character code to a different character. For example, a character code "97" in the PDF document might normally represent an "a" character; however, if the font has been re-encoded, this can be a completely different character. A transformation matrix or similar instructions can also accompany a segment 46 in information 50 if the segment is to be rotated or positioned in a non-standard orientation. In addition, information relating to the display of text segments can be included in one main location in the PDF document, such as at the beginning of the document. The creation of PDF or other type of portable electronic documents is well known to those skilled in the art.

In FIG. 2b, text segments 46 are stored in the document in the same order in which they are finally displayed on display screen 22 as shown in FIG. 2a. For example, the text segments "f," "oo," and "bar" are stored in the same order as they are displayed on screen 22. Herein, the order which segments are stored in the PDF document are referred to as the "stored order." This is also the order in which the computer processes the text segments from the PDF document and displays the segments, one at a time, on the screen. The order of the segment images as displayed in their final positions on a display screen, or as the images are ultimately shown on an output sheet of paper, is referred to herein as the "display order." Typically, the display order is in a left-to-right, then up-to-down direction, as if reading words in English.

FIG. 3a is a diagrammatic illustration of a portion of a display screen 22 showing displayed images 52 derived from a scattered PDF document (shown in FIG. 3b, below). Images 52 correspond to text segments stored in the PDF document, and each segment is displayed at a position determined by its associated coordinates and according to parameters stored in information 50.

FIG. 3b is a diagrammatic illustration of a PDF document 54 which provides images 52 displayed on screen 22 in FIG. 3a. Similar to the PDF document 42 shown in FIG. 2b, PDF document 54 includes display commands 44', text segments 46' associated with the display commands, coordinates 48' associated with segments 46', and information 50' for displaying the segments. However, in PDF document 54, the stored order of the segments in the document does not correspond to the display order of the segments on the screen. The stored order of the segments is "llo," "rld," "He," and "Wo." In contrast, the display order of the segments is "He," "llo," "Wo," and "rld." Some application programs which create PDF or other portable electronic documents store characters or segments in scattered or non-consecutive stored orders which differ from the display order of the segments. Thus it can be difficult to distinguish words in a portable electronic document if the segments in the document are examined in their stored order; an incorrect or garbled word can result from reading consecutive segments in the stored order. Herein, a portable electronic document in which the stored order and the display order of segments are different is referred to as a "scattered" document.

In the described embodiment, text segments can be sorted and reordered in a word list according to their coordinates. When the segments are delivered to a client process, they are thus delivered in their final display order.

Figure 4A:
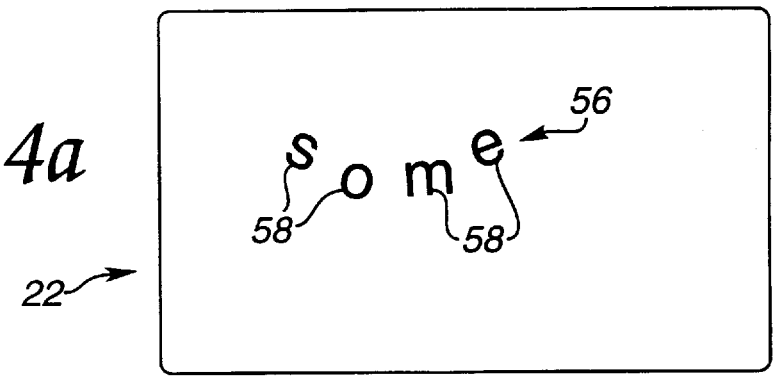
FIG. 4a is a diagrammatic illustration of a portion of a display screen showing rotated displayed images derived from a portable electronic document.

FIG. 4a is a diagrammatic illustration of a portion of a display screen 22 showing rotated displayed images 56 derived from a PDF document (shown in FIG. 4b, below). Each individual image 58 has been rotated so that the images form a curved path; images 58 thus do not have the same text baseline. A text baseline is a line with which the bottom ends of non-descending characters in a line of text are aligned. For example, in FIG. 3a, all the characters of the word "Hello" have the same text baseline and y coordinate.

Figure 4B:
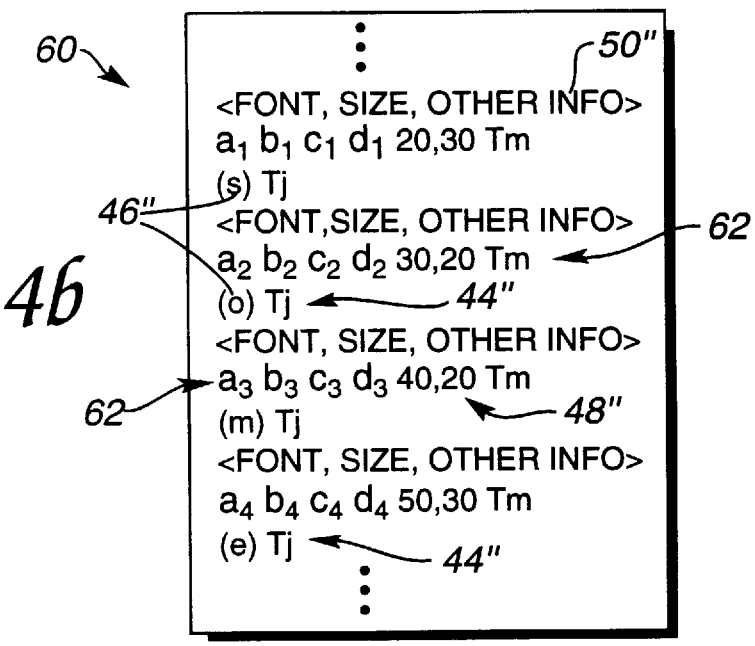

FIG. 4b is a diagrammatic illustration of a PDF document 60 which provides images 56 displayed on screen 22 in FIG. 4a. Document 60 includes display commands 44", text segments 46", and information 50" similar to equivalent data shown in FIGS. 2b and 3b. In document 60, coordinates 48" are included in a transformation matrix 62 associated with each segment 46." The transformation matrix provides information to the microprocessor or output device to rotate and scale the associated segment when displaying the segment. The transformation matrix can include several factors, shown as "$a_1$, $b_1$, $c_1$, $d_1$", etc., which can modify the angle and position of the displayed segment. Transformation matrices are well-known to those skilled in the art. Transformed text segments may cause difficulty in identifying words, since the segments may be placed in non-linear positions and gaps between segments can be irregularly sized to cause confusion as to when a word ends and the next word begins.

Figure 5:
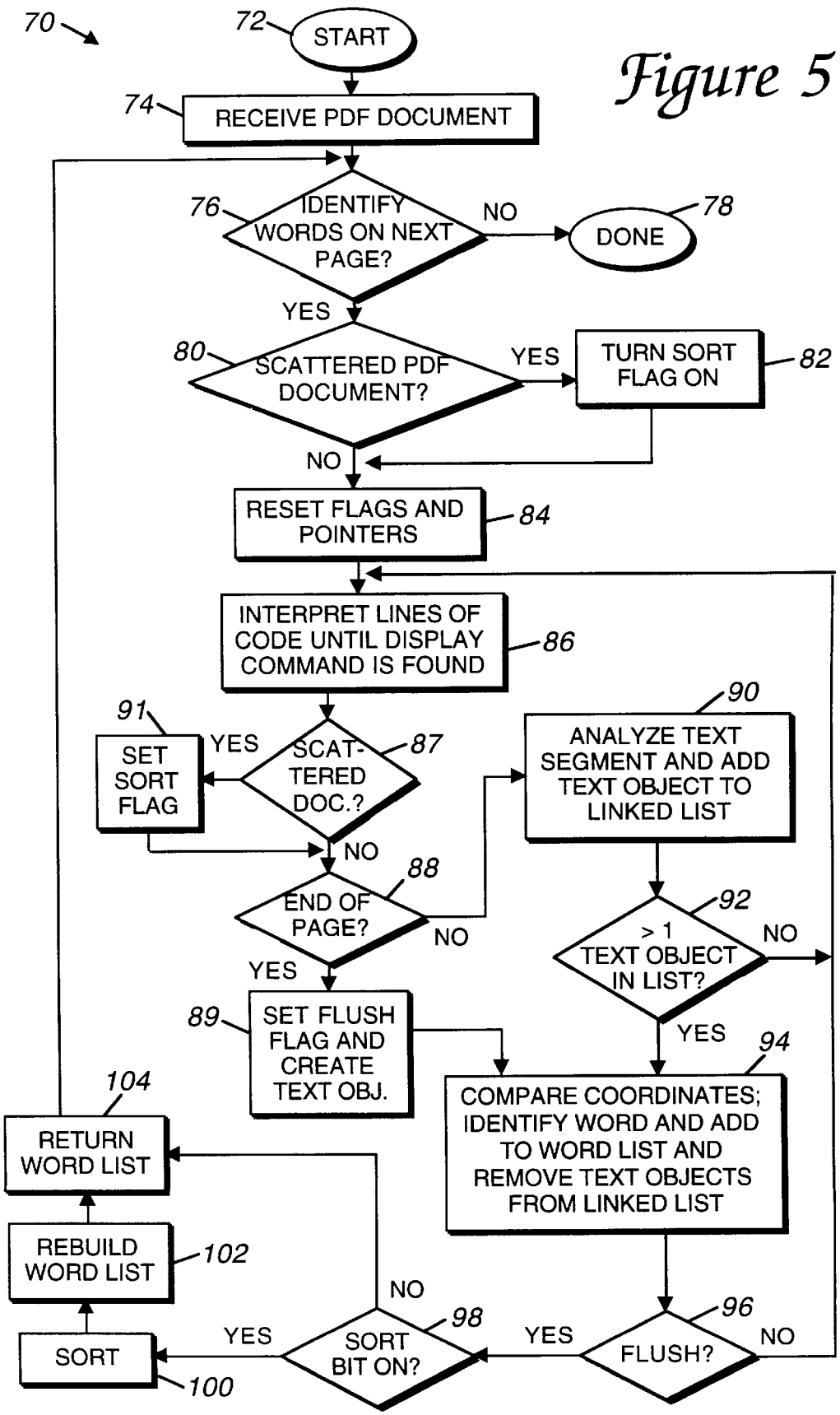
FIG. 5 is a flow diagram illustrating the process of the present invention for identifying words in a portable electronic document.

FIG. 5 is a flow diagram illustrating the process 70 of the present invention for identifying words in a portable electronic document. The process begins at 72. In step 74, computer system 10 receives a portable electronic document, referred to herein as a PDF document. A PDF document, as described above, is a file or other collection of data which includes coded objects stored in the PDF language.

In the described embodiment, the PDF document is received from another application program implemented by the microprocessor 12 (or a different computer system which provides data to microprocessor 12, for example, through network interface 30 or floppy disk 26). The PDF document can be manipulated by other application programs and are well-known to those skilled in the art. For example, Acrobat allows a user to search an electronic document, such as a PDF document, for objects having a variety of formatting characteristics and types. If a user wishes to search a PDF document accessible to Acrobat, Acrobat can send the PDF document to the process of the present invention, which would detect words in the PDF document and provide those words to Acrobat. Herein, application programs which can provide the PDF document to the present invention and can receive the output of the present invention, such as Acrobat, are referred to as "clients" or a "client process." Alternatively, the process of the present invention can output words to a file. For example, the present invention can detect all the words in a PDF document and output those words to a destination file; the "client" in this case could simply be the destination file.

In addition to sending a PDF document to computer system 10 running the process of the present invention, the client can also send additional information related to the characters in the PDF document. This additional information can include, for example, a table of categories which provides the category of each type of character in the file. For example, the table can indicate whether a character is a letter, a digit, punctuation, hyphen, uppercase, or lowercase. A character can be in more than one category. If the client does not supply all or some of the above additional information, the process of the present invention can use a default table with standard categories for characters that are well known to those skilled in the art. The client can also supply a list of characters which are ligatures, which are two or more characters which are joined together, such as "æ", as well as the distinct characters that make up the ligatures (e.g., "a" and "e"). Other information about irregular characters or segments can also be provided by the client.

In next step 76, the microprocessor checks whether to identify words on the next page of the PDF document. If there are no more pages in the PDF document, or if the client has provided a command to stop identifying words, then the next page is not examined, and the process is complete as indicated at 78. If the next page is to be examined to identify words, the process continues to step 80. In step 80, the microprocessor determines if the PDF document is scattered, which means that the document includes text segments in a stored order that is not the same as the display order of the segments, as described above with reference to FIG. 3b. In the described embodiment, the scattered or unscattered state of the PDF document at this step in the process can be explicitly indicated in the document or by a command or flag set by the client. For example, if portable electronic documents generated by specific application programs are known to all be scattered, then the microprocessor can examine the PDF document to check if one of those application programs created the document. If the creating application program is not known, the present invention also can look at the text segments in the PDF document and then determine if the document is scattered; this is detailed below in step 87.

If the PDF document is determined to be scattered in step 80, a sort flag is turned on in step 82. This flag indicates that the scattered document should be sorted at a later step in the process before words are delivered to the client. After step 82, or if the PDF document is scattered or has an unknown scattered state, then step 84 is implemented, in which flags and pointers used by the process of the present invention (explained below) are cleared or reset and other standard clean-up and initialization procedures are implemented. The one flag that is not reset in step 84 is the sort flag, which is left in its previous state.

In next step 86, the lines of code (commands, data, etc.) in the PDF document are interpreted by an interpreter until a display command such as "Tj" is found. This indicates that a text segment has been found in the PDF document. Other commands which indicate the presence of a text segment can also be checked in alternate embodiments. The process of interpreting the lines of code in the document and finding a text segment is described in greater detail with respect to FIG. 6. In step 87, the microprocessor checks if the PDF document is a scattered document. This step is implemented only if the sort flag has not been set, which means that the scattered state of the document is not yet known. To determine if the document is scattered, the microprocessor examines the text segment retrieved from the PDF document. The y coordinate of the text segment is checked to determine if it differs by a threshold distance from the y coordinate of the text segment which was previously retrieved in step 86. For example, the threshold can be twice or more than the height of a line of text in the PDF document. If the y coordinates differ by the threshold or more, then a check flag is set. If the next text segment retrieved in step 86 has a y coordinate which differs from the last segment's y coordinate by the threshold or more in the direction of previously-retrieved text segments, then the PDF document is considered a scattered document, and the process continues to step 91, where the sort flag is set. The microprocessor thus looks for a scattered up-and-down positioning of successive text segments (or left-to-right, if the text is oriented top-to-bottom). After step 91, or if the y coordinates are within the threshold, the process continues to step 88. Each time a segment is retrieved from the PDF document, the microprocessor checks for a scattered document. Once the sort flag has been set (in step 82 or 91), then the microprocessor skips step 87 when retrieving further text segments in step 86. The setting of the sort flag has the additional effect of disabling any hyphen-examining logic, for example, in FIG. 13, since retrieved text segments cannot be assumed to be adjacent if the PDF document is scattered.

In step 88, the microprocessor checks if the interpreting of the lines of code is complete and the end of the page has been reached. This occurs when all of the text segments on the current page have been interpreted, i.e., an end-of-page indication, such as a command, in the PDF document is found. If the all the text segments on the page have not been interpreted, then the process continues to step 90, where a text segment found in step 86 is analyzed and added to a linked list as a text object. This step is described in greater detail with respect to FIG. 7. In next step 92, the microprocessor determines if there is more than one text object in the linked list. If not, the process returns to step 86 to find another text segment in the PDF document. If there is more than one text object in the list, the process continues to step 94, which is described below.

If at an end of page in step 88, the process continues to step 89, where a "flush" flag is set. This flag indicates to the microprocessor to flush remaining text objects to the word list in step 94, described below. In addition, a text object is created for the last text segment interpreted from the PDF document before the end of page indication. The process then continues to step 94.

In step 94, the coordinates of the text objects in the linked list are compared according to heuristics, the characters in the text objects are examined to determine if any work break characters exist, and a word is identified from the text objects. The identified word is added to a word list and the text object or objects used to identify the word are then removed if these text objects have been completely analyzed. Step 94 is described in greater detail with respect to FIG. 11.

After step 94, the process continues to step 96, in which the microprocessor checks if the flush flag has been set, indicating that the end of the page has been reached. If the flush flag is false (not set), the process returns to step 86 to interpret more lines of code in the PDF document and find another text segment. If the flush flag is set, then the process continues to step 98, in which the microprocessor checks if the sort bit has been set, i.e., if the PDF document is a scattered document. If so, the process continues to step 100, where the word list is sorted by the values of the coordinates. This step is described in greater detail with respect to FIG. 15. After the sort, the word list is rebuilt in step 102 to concatenate any leftover word fragments in the word list, which is described in greater detail with respect to FIG. 16.

Once the word list has been rebuilt in step 102, or if the sort bit is false in step 98, the process continues to step 104, where the word list of identified words is returned to the client. In the described embodiment, each word in the word list includes several attributes. Each word (or "word object") includes five word attributes, which are the word's font, color, bounding box coordinates, word number as counted from the beginning of the page, and character number of the first character of the word as counted from the beginning of the page. Each word in the word list also includes two character attributes for each character of the word, which are the character code providing the identity of the character, and the character type. For example, for a word such as "Hello-", the font might be Times, the color might be black, the word number might be 87, and the character number might be 345. The character attributes might be the code for "H" and a character type of "uppercase letter". Similarly, the hyphen character ("-") is stored with a character code and a character type of "hyphen". The client can use the word attributes to help display the identified word. For example, the client can use the coordinates of a bounding box to highlight a received word in a text editor.

The words in the word list can be returned to the client one word at a time, as the client requests each word; or, the entire word list can be provided to the client at one time. Once the word list has been returned, the process returns to step 76 to check if the words on the next page are to be identified, and, if so, the entire process is repeated.

The described embodiment of the present invention is page based, i.e., one page of text segments is analyzed and built into a word list before the next page of the document is analyzed. Characters such as a soft hyphen between pages will not be detected by the described page-based process. However, a step can be added in an alternate embodiment to detect a hyphen after the last text segment on a page. For example, in such an embodiment, when the last text object is to be flushed in step 169 of FIG. 11 and added to the word list (described below), the last character in this text object can be examined. If the last character is a soft hyphen (i.e., a hyphen that occurs at the end of a line of text, and which thus indicates that the word before the hyphen should be appended to the word on the next line), then the word in the text object should not be added to the word list yet. The first line of the next page can be interpreted, converted into text objects, and analyzed to find the next word. The next word can then be concatenated with the hyphenated word and then added to the word list.

Figure 6:
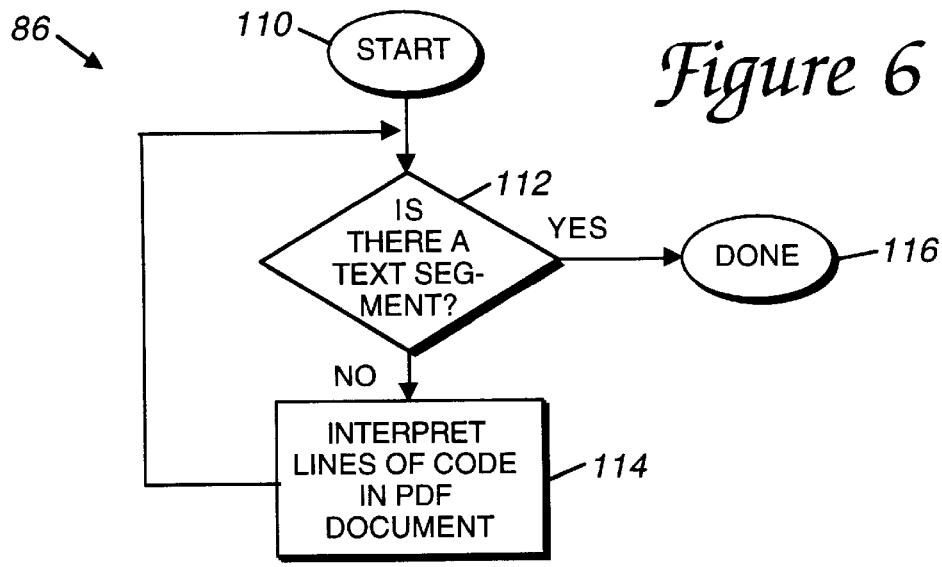
FIG. 6 is a flow diagram illustrating a step of FIG. 5 in which the lines of code in the portable electronic document are interpreted until a display command and text segment are found.

FIG. 6 is a flow diagram illustrating step 86 of FIG. 5, in which the lines of code in the PDF document are interpreted until a display command, such as "Tj", and a text segment are found. The process begins at 110, and, in step 112, the microprocessor determines if a text segment has been found in the PDF document. If a text segment has not been found, the process continues to step 114, where the microprocessor interprets a line of code from the PDF document to determine if a text segment is present. The microprocessor uses a portable electronic document interpreter to execute the instructions in the PDF document and, when a display command is executed, to pass the text segment associated with the display command to the current process. The present process also examines the "graphics state" of the interpreter to find the related information associated with the text segment. The graphics state is a collection of values which can apply to the current text segment and are maintained and updated as the PDF instructions are executed. For example, the position of a pointer which points to an instruction is updated, and the font type, color, rotation, etc. of the current text segment is found and updated. From the graphics state, the coordinates, font, size, orientation, etc. of the text segment can be determined, as is well-known to those skilled in the art. The process then returns to step 112. Once a text segment has been found as checked in step 112, the process is complete as indicated at 116.

Figure 7:
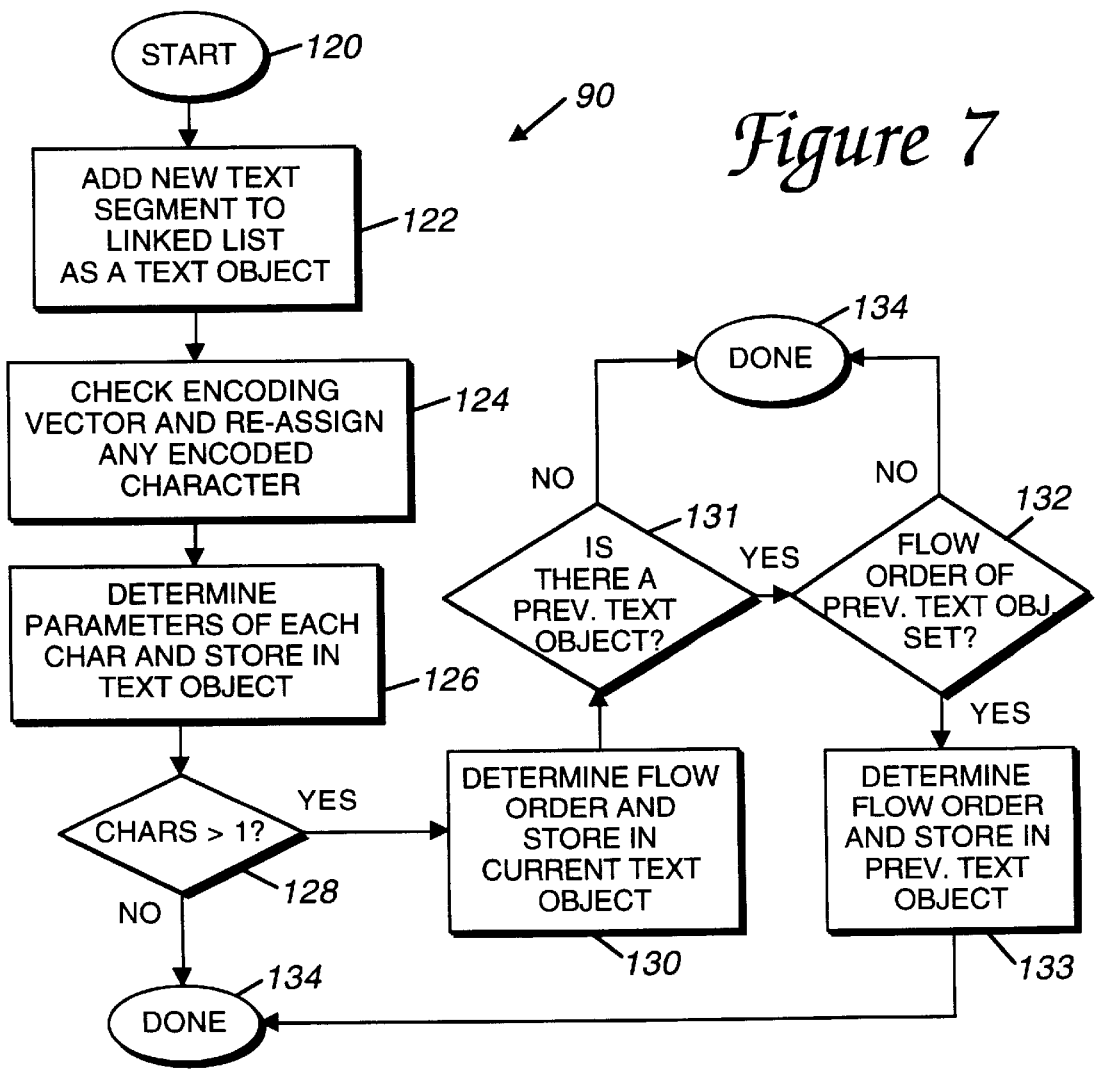
FIG. 7 is a flow diagram illustrating a step of FIG. 5 in which a found text segment is analyzed and a text object is created for the text segment and added to a linked list.

FIG. 7 is a flow diagram illustrating step 90 of FIG. 5, in which the found text segment is analyzed and a text object is created for the text segment and added to a linked list. The process begins at 120. In step 122, the a text object is created and added to the end of a linked list of text objects. In alternate embodiments, other types of lists besides linked lists can be used. The "text object" referred to herein is a node in the linked list which, in the described embodiment, includes a number of fields. These fields are detailed below with respect to FIGS. 8a–10b. The text segment found in the PDF document is placed in one of the fields of the text object. The characters of the text segment in a text object are referred to herein as the characters of the text object.

Referring back to FIG. 7, in step 124, the encoding vectors for the characters in the text segment are checked and any encoded character is reassigned to a code which is compatible with the client. In typical PDF documents or other portable electronic documents, some character codes used in the document may be assigned to different characters. For example, an application program which generated a PDF document might store a character as the number "97", which usually represents an "a" character, and then reassign the "97" to be a different character, such as a "@" symbol. Typically, encoding information is included in the PDF document in an encoding table or in the information 50 associated with each text segment. This encoding information indicates which characters in a text segment have been reassigned to different characters than the standard character set of that text segment's font, and the codes that have been reassigned. The client's encoding vectors are known when the client sends the PDF document to the process of the present invention. With the PDF document and other information as described with reference to FIG. 5, the client sends its own encoding vectors which tells the microprocessor which codes should represent which characters. In step 124, the microprocessor examines the encoding information in the PDF document and the encoding information sent by the client, and changes the encoded characters to a code equivalent to the reassigned code which is compatible to the client's character scheme.

In step 126, the parameters of each character of the text segment stored in the text object are determined and stored in the text object. The parameters are read from the PDF document and stored in fields of the text object. The linked list and parameters stored in the text objects of the described embodiment are shown in FIGS. 8a–10b.

Figure 8A:
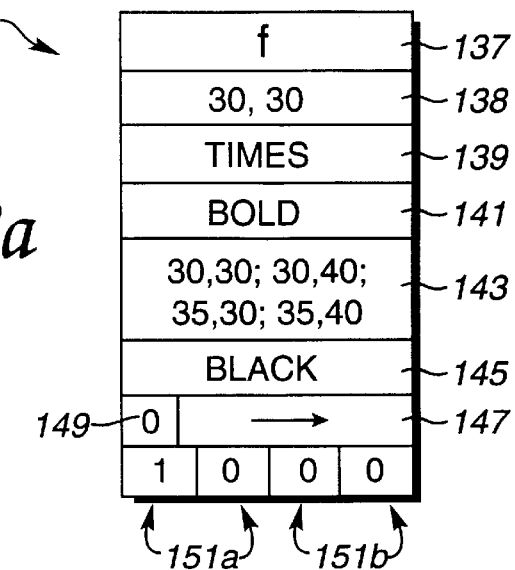
FIG. 8a is a diagrammatic illustration of a text object of the present invention.

In next step 128, the microprocessor checks if the text object just created includes more than one character. If not, the process is complete at 134. If there is more than one character, step 130 is implemented, in which a flow order is determined and a flow order indicator is stored in the text object as shown in FIG. 8a. The flow order is the direction of characters as they are displayed on a page. In the described embodiment, the flow order is specified by one of four directions (four numbers), which are left-to-right, right-to-left, up-to-down, and down-to-up. The flow direction of the text object indicates the direction that a word flows; for example, if text is positioned vertically down a page when displayed, the order would be up-to-down. The flow order can be determined by examining the coordinates of the characters in the text object. After step 130, step 131 is initiated, in which the microprocessor checks if there is a previous text object in the linked list. If so, step 132 is implemented, in which the microprocessor checks if the flow order of the previous text object has been set. If not, then, in step 133, the flow order of the previous text object is determined by examining the coordinates of the previous text object and the current text object; this flow order is stored in the previous text object. If the flow order of the previous text object has been set in step 132, or if there is no previous text object in the linked list in step 131, then the process is complete at 134. Later text objects can thus be used to find the flow direction for previous text objects which include only one character and thus did not have a flow direction immediately determined.

As shown in FIG. 8a, a text object 136 preferably includes fields for storing a text segment 137 as well as other parameters of the text segment, including coordinates 138 of the text segment 137 (typically shown as x,y coordinates), the font 139 of the text segment 138, the style 141 of text segment 137 (such as bold, italics, underlined, etc.), the bounding box parameters 143 of text segment 137 (which, in the described embodiment, includes the four points of the bounding box surrounding the text segment), and the color 145 of the text segment 137. The flow direction 147 is also included, which indicates the direction of text segments as displayed on the page as described above. In addition, a rotation flag 149 indicates if the text object is rotated, i.e. the text segment included a transformation matrix which altered the orientation of the text segment. Finally, a text object preferably includes two character position flags 151a, STARTFLAG and ENDFLAG. These flags are set to 1 if the characters of a start of a word and the end of a word, respectively, are located in the text object. Two character offset pointers 151b, STARTOFFSET and ENDOFFSET, are also included. These offsets indicate the character position of the start of a word and the end of a word, respectively, from the beginning of the text object, where the first character position is 0. Flags 151a and offsets 151b are used in the process of identifying words in the text objects, and are described with respect to FIG. 11. In alternate embodiments, other characteristics of text segments can be stored as well.

These characteristics of the text object are retrieved from the PDF file and stored in the text object along with the text segment. In the example of FIG. 8a, the text segment "f" is the first text segment from the PDF document 42 shown in FIG. 2b. If some characters in a text object have different fonts, then multiple parameters can be stored in the field for that parameter; for example, if characters in a text object have different fonts, all the fonts for the text object can be stored in the font field 139.

Some text segments in a PDF document might include more than one word or portion of a word. For example, a command "(Hello World) Tj" is code to display the text segment "Hello World". The entire text segment, which includes two words separated by a space, would be included in a single text object. Multiple words would be identified from such a text object, as detailed below with respect to FIG. 11, and the flags and offsets in the text object would be reassigned as separate words in the text object are identified and added to a word list. For example, once the word "Hello" is identified and added to the word list, STARTOFFSET (the start of a word) would be changed from character position 0 ("H") to position 6 ("W"). ENDOFFSET would change from position 4 ("o") to position 10 ("d") as the end of a word.

Figure 8B:
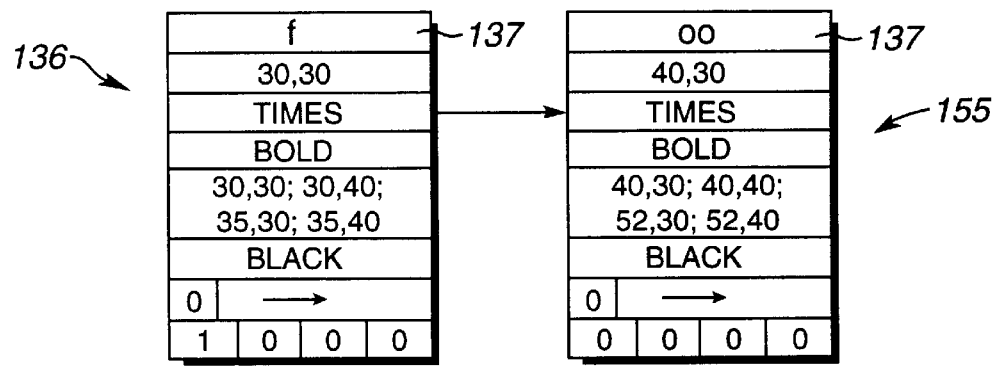
FIG. 8b is a diagrammatic illustration of the first two text objects in a linked list for the portable electronic document shown in FIG. 2b.
Figure 8C:
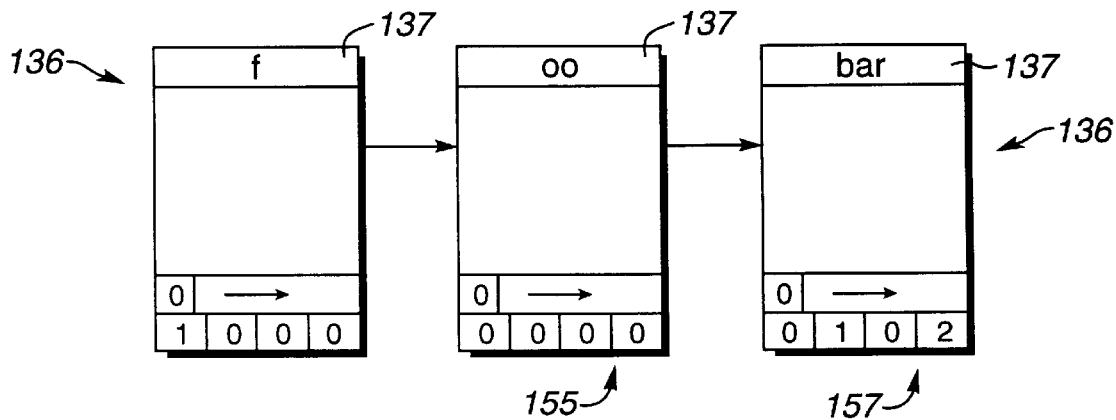
FIG. 8c is a diagrammatic illustration of the three text objects in the linked list for the portable electronic document shown in FIG. 2b.

FIG. 8b is a diagram illustrating the first two text objects in a linked list for the PDF document 42 shown in FIG. 2b. The first text object 136 is for the text segment "f", and the second text object 155 includes the text segment "oo." The third text object is then added to the linked list from PDF document 42, and the result is shown in FIG. 8c. Text object 157, which includes the text segment "bar," has been added to the end of the linked list.

FIG. 9a is a diagram illustrating the first text object 136' in the linked list created for the PDF document 54 shown in FIG. 3b. Similar to text object 136 in FIG. 8a, text object 136' includes the fields described with reference to FIG. 8a. In FIG. 9b, a linked list 159 is shown including all the text objects derived from the PDF document shown in FIG. 3b. The order of text objects in the linked list is the same as the stored order of the text segments in the PDF document. In this example, since the PDF document was a scattered document, the text objects in the linked list are not in a display order.

FIG. 10a is a diagram illustrating the first text object in the linked list created for the PDF document 60 shown in FIG. 4b, and is similar to the text objects 136 and 136' shown in FIGS. 8a and 9a, respectively. Since the text segment "s" was rotated as shown in FIG. 4a, the rotation flag 149 is set for this text object. FIG. 10b shows a linked list 161 which includes all of the text objects derived from the PDF document 60 shown in FIG. 4b.

Figure 11:
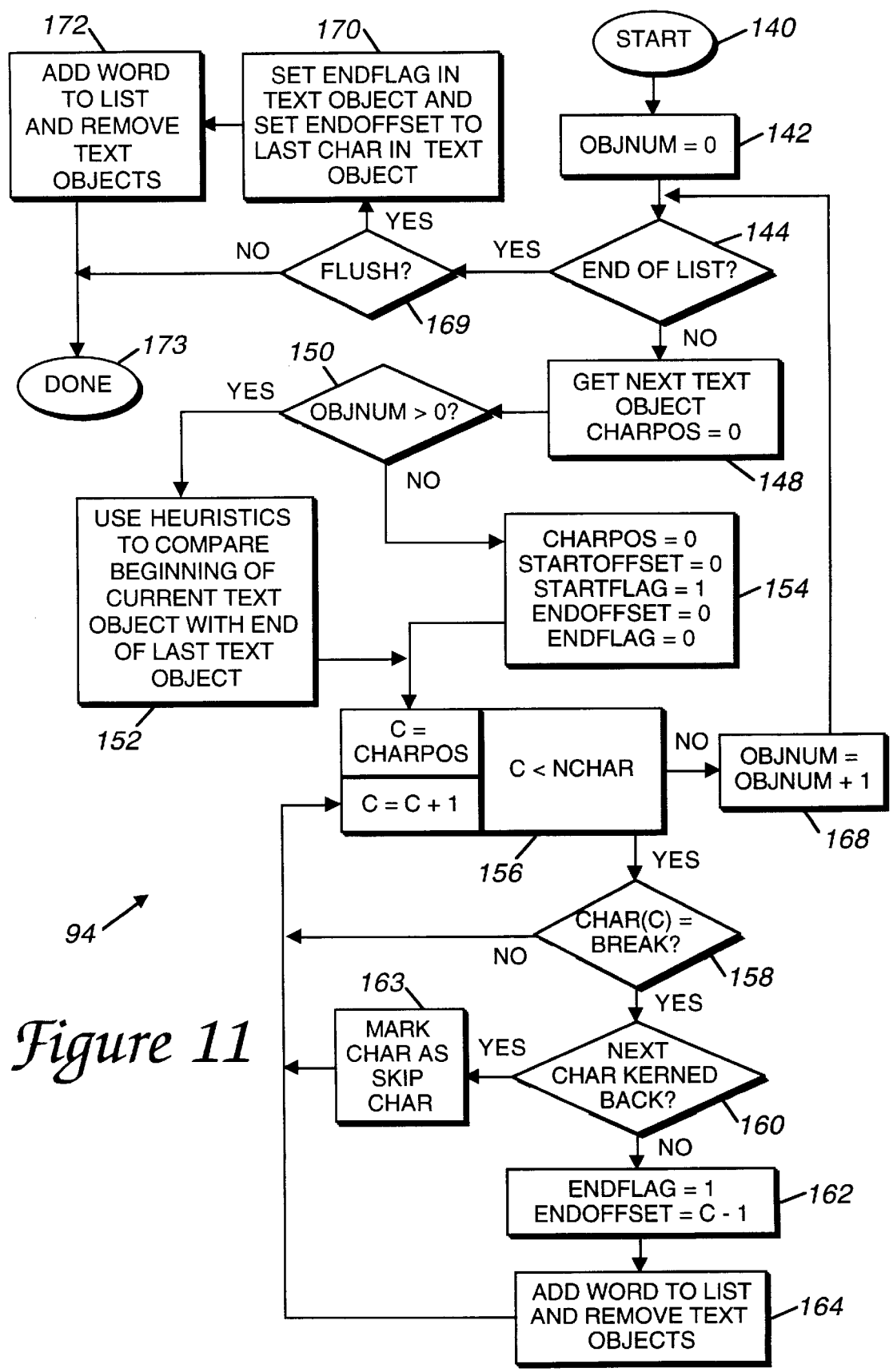
FIG. 11 is a flow diagram illustrating a step of FIG. 5 in which the coordinates of text objects are compared, a word is identified, the word is added to a word list, and one or more text objects are removed from the linked list if completely analyzed.

FIG. 11 is a flow diagram illustrating step 94 of FIG. 5, in which the coordinates of text objects are compared, a word is identified, the word is added to a word list, and one or more text objects are removed from the linked list if completely analyzed. The process starts at 140. In step 141, the variable OBJNUM is initialized to zero. OBJNUM represents the number of the currently-examined text object in the linked list. In step 144, the microprocessor determines if there are no more text objects in the linked list to process. If so, the process continues to step 169 (detailed below). If there are more text objects in the linked list, the process continues to step 148, in which the next text object is retrieved from the linked list. In addition, the variable CHARPOS is set to zero. CHARPOS is a character position indicator used to examine the characters of the text object.

In next step 150, the microprocessor determines if OBJNUM is greater than zero. If not, then the current text object is the first text object in the linked list, and step 154 is initiated, in which CHARPOS is cleared to 0, and flags 151a and offsets 151b (as shown in FIG. 8a) of the current text object are initialized: STARTFLAG is set to 1, ENDFLAG is cleared to zero, STARTOFFSET is cleared to zero, and ENDOFFSET is cleared to zero. The process then continues to step 156 (described below). If OBJNUM is greater than zero in step 150, then a previous text object is already in the linked list. Step 152 is implemented, in which heuristics are used to compare the beginning of the current text object with the end of the last text object. Step 152 is described in greater detail with respect to FIG. 13. After step 152 has been completed, step 156 is initiated.

In step 156, a loop begins. The variable C is initialized to CHARPOS, and C is compared to NCHAR, which is the number of characters in the current text object. If C is less than NCHAR, step 158 is implemented, in which the microprocessor checks if char(C) of the current text object is equal to a break character. A break character is a character that indicates a word break has been found and that the previously-examined characters should be grouped as a word.

In the described embodiment, an extensive list of word break characters are compared to the char(C). This list includes standard symbols, punctuation, and other characters which have become associated with various fonts. The list of characters includes a space and these symbols listed in their standard names, which are referred to herein as "punctuation characters": exclamation point, double quote, numbersign, dollar sign, percent, ampersand, left parentheses, right parentheses, plus, comma, period, slash, colon, semicolon, less than, equal, greater than, question mark, at symbol, left bracket, right bracket, bar, bullet, florin, double base quote, ellipsis, perthousand, double left quote, double right quote, emdash, endash, trademark, tilda, exclamdown, cent, sterling, currency, yen, brokenbar, section, copyright, ordfeminine, ordmasculine, registered, guillemotleft, logical not, macron, degree, plusminus, twosuperior, threesuperior, paragraph, period centered, onesuperior, one quarter, guillemotright, one half, three quarters, question down, multiply, hyphen, divide, tilde, asciitilde, circumflex, asciicircum, quoteleft, underscore, guilsingleleft, quotesinglbase, guilsinglright, fraction, asterisk, backslash, dagger, braceleft, bracketright, dagger, and double dagger.

If char(C) is not a break character in step 158, the process returns to step 156, where C is incremented and again compared to NCHAR. If char(C) is break character, step 160 is implemented, in which the microprocessor determines if the character following the current character is kerned back. "Kerning" is the term used to specify the control of spacing between two characters. If a character is kerned back, i.e., negatively kerned, that character is moved closer to the previous character (determined by looking at the next character's coordinates). If the next character in the text object is kerned back, then step 163 is initiated, in which the current break character found in step 158 is marked as a "skip character", which, in the described embodiment, means that a flag is set in the character type so that the character will be skipped when a word is added to the word list in step 164. The process returns to step 156 to increment C and compare C to NCHAR. An example of a character that has been kerned back is shown in FIGS. 12a and 12b, described below.

If the next character is not kerned back in step 160, then step 162 is initiated, where ENDFLAG of the current text object is set to 1 and ENDOFFSET is set equal to C−1, which would be the last character of a word. In next step 164, the identified word is added to the word list and text objects are removed from the linked list. The added word is taken from the characters in previous and/or current text objects. The process of adding a word to the word list and deleting text objects is described in greater detail with respect to FIG. 14. The process then returns to step 156, where C is incremented. If C is equal to or greater than NCHAR in step 156, the process continues to step 168, where OBJNUM is incremented. The process then returns to step 144. The characters of another text object are then analyzed if there are any text objects remaining in the linked list. If there are no text objects remaining, then step 169 is initiated.

In step 169, the microprocessor checks if the flush flag has been set. If so, then the last text object is currently being examined, and step 170 is implemented. In step 170, END-FLAG for the current text object is set to one and ENDOFFSET is set to the last character of the current text object. In next step 172, a word from the current text object is added to the word list. Step 172 is described in greater detail with respect to FIG. 14. The process is then complete as indicated at 173.

Figure 12A:
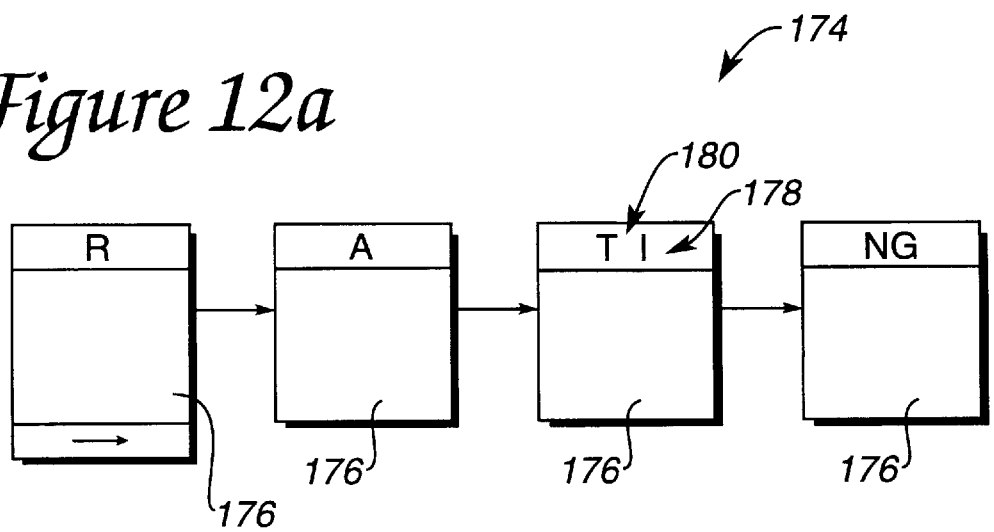
FIG. 12a is a diagrammatic illustration of a linked list of text objects derived from a portable electronic document, where one of the text objects includes a negatively-kerned character.
Figure 12B:

FIG. 12a is a diagrammatic illustration of a linked list 174 of text objects 176 derived from a PDF document, where one of the text objects includes a negatively-kerned character. The text segments retrieved from the PDF file and placed in the text objects 176 include text segments "R", "A", and "NG". Text segment 178 is different in that it includes the characters "TI," where a space 180 is included between the "T" and "I" characters. However, the coordinate information for the I character stored in the PDF document indicates that the "I" is positioned close to the "T" when these characters are displayed by an output device; the "I" is thus kerned back.

FIG. 12b is a diagram of a portion of a display screen 22 which shows images 181 of the text objects in linked list 174 of FIG. 12a. All the characters in the linked list are shown with normal spacing between the characters, including the "I" and "T" characters, which were spaced apart by a space character in the text object. The "I" has been kerned back to fill in the space between the characters. Thus, if a character is negatively kerned, then a word break character positioned before the kerned character, such as space 180, does not actually indicate that a word has ended. This word break character thus should not be included in an identified word, and is marked as a skip character so that it will not be added to the word list.

Figure 13:
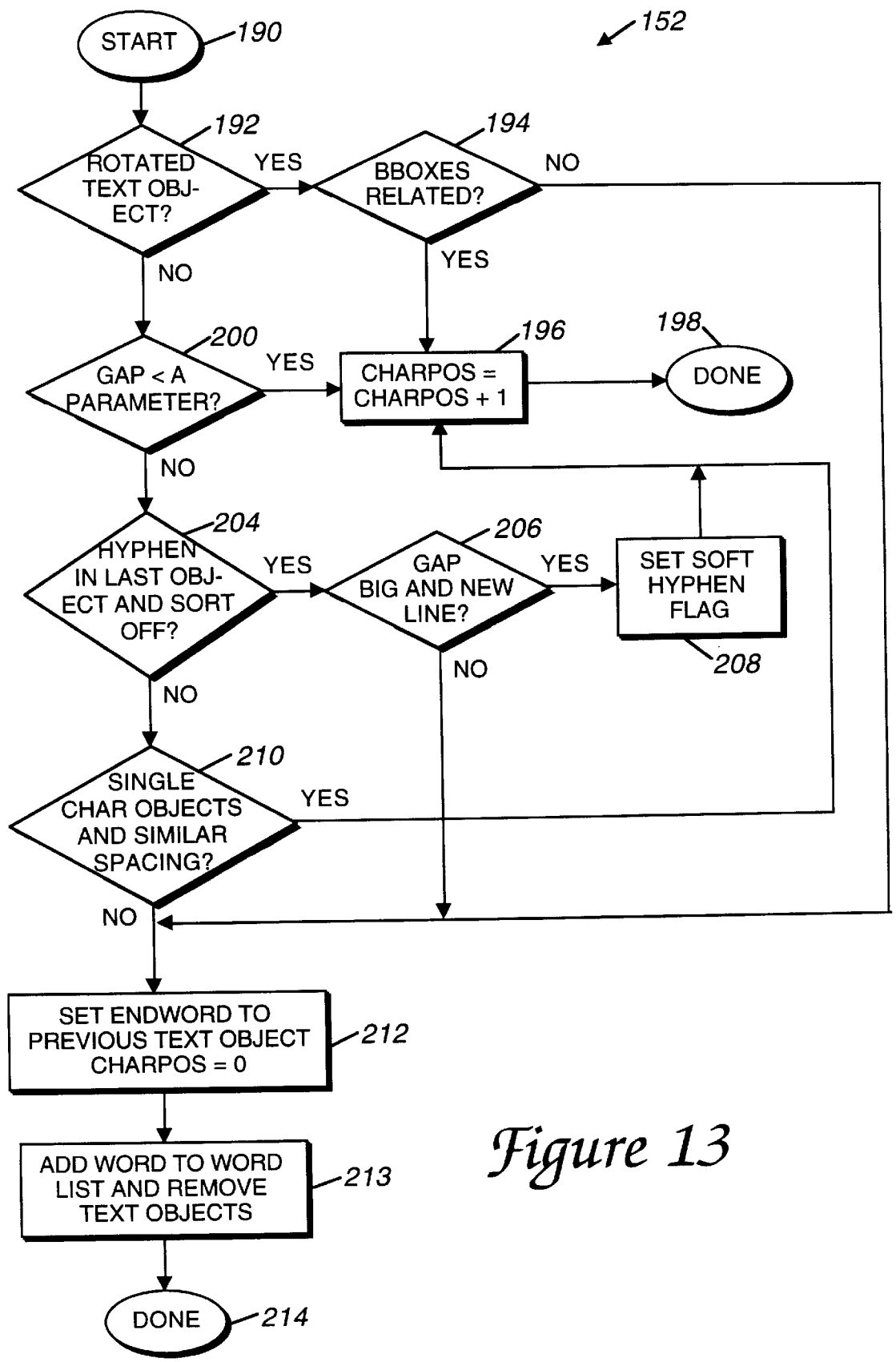
FIG. 13 is a flow diagram illustrating a step of FIG. 11 in which the gap between the beginning of the current text object and the end of the last text object is analyzed.

FIG. 13 is a flow diagram illustrating step 152 of FIG. 11, in which the gap between the beginning of the current text object and the end of the last text object is analyzed. The process begins at 190. In step 192, the microprocessor checks if the text object is rotated, i.e., if the text object includes a rotation flag 149 as shown in FIG. 10a. If so, step 194 is initiated, in which the microprocessor checks if the bounding boxes of the current text object and the last text object are related. A bounding box is a quadrilateral whose sides are positioned just outside the edges of the text segment so that the segment is completely enclosed by the bounding box. In the described embodiment, four sets of coordinates for all four corners of the bounding box are known for each segment from the PDF document. If the bounding boxes of the beginning of the current text object and the end of the previous text object intersect, then the bounding boxes are considered "related": they are part of the same word. Methods of determining if bounding boxes intersect are to those skilled in the art. Similarly, if the bounding boxes of the text objects are located within a predetermined distance of each other, the bounding boxes are considered related. In the described embodiment, if the boxes have a gap of 1/20 of the value of the height of the bounding box of the current text object between them or less, they are considered part of the same word. If the bounding boxes are related in step 194, then CHARPOS is incremented by 1 in step 196 and the process is complete at 198. If the bounding boxes are not related, the process continues to step 212, described below.

If the current text object is not determined to be rotated in step 192, then step 200 is initiated, in which the microprocessor checks if the gap between the beginning of the current text object and the end of the previous text object is less than a predetermined parameter. The size of the gap can be calculated by examining the coordinates of each text object and calculating the widths of each of the characters in each text object using the size information included with the font information of each text object. The flow order included in each text object informs the microprocessor which coordinates to use in calculating the character widths needed in calculating the gap threshold. In the described embodiment, the predetermined parameter used as a gap threshold is determined by a specific algorithm:

---

If the end of the previous text object ≧ the start of the current text object + the average width of the characters in the current text object, or if the start of the current text object ≧ end of previous text object + the average width of the current text object divided by 4, then the gap is large enough to be a word break.

---

The above algorithm is used for left-to-right or bottom-to-top flow directions. In right-to-left and top-to-bottom flow directions, the "≧" signs are changed to ">" signs and the plus signs are changed to minus signs. If the gap is too small to be considered a word break, then the beginning of the current text object and the remaining portion of the previous text object are considered part of the same word, and the process continues to step 196 to increment CHARPOS. The process is then complete as shown at 198.

If the gap between text objects was not less than the predetermined parameter in step 200, then step 204 is initiated. In step 204, the microprocessor checks if a hyphen is present at the end of the previous text object and if the sort flag is off. If so, then the microprocessor checks if the gap between the previous text object and the current text object is large and if the current text object is on a new line in step 206. If both these conditions are true, then the soft hyphen character type flag is set for the last character of the previous text object in step 208 to indicate that the word is hyphenated and is a word fragment (steps 204, 206 and 208 are not implemented if the sort flag is set). Words in the word list with soft hyphens will later be concatenated to other words, as described in FIG. 16. The variable CHARPOS is then incremented in step 196 and the process is complete at 198. If there is not a large gap or if the current text object is not on a new line in step 206, then the process continues to step 212, described below.

If there is no hyphen in the last object or if the sort flag is off in step 204, then step 210 is initiated. In step 210, the microprocessor checks if the current and previous text objects are single character objects and have similar spacing on either side of the objects. This would indicate that, even though the gap between the text objects is large, all the characters of the word have been spaced apart an equal amount, as is often done to emphasize a word, as in a title.

If so, then CHARPOS is incremented in step 196 and the process is complete as indicated at 198. If the conditions of step 210 are not true, then the gap between the text objects is considered a word break, and the previous text object is the end of a word. In step 212, the ENDFLAG is set to 1 in the previous text object and the ENDOFFSET of the previous text object is set to the position of the last character of the previous text object. STARTFLAG of the current text object is set to 1, and STARTOFFSET of the current text object is set to 0. In next step 213, a word is added to the word list, one or more text objects are removed from the linked list, and CHARPOS is set to zero. The process is then complete as indicated at 214.

Figure 14:
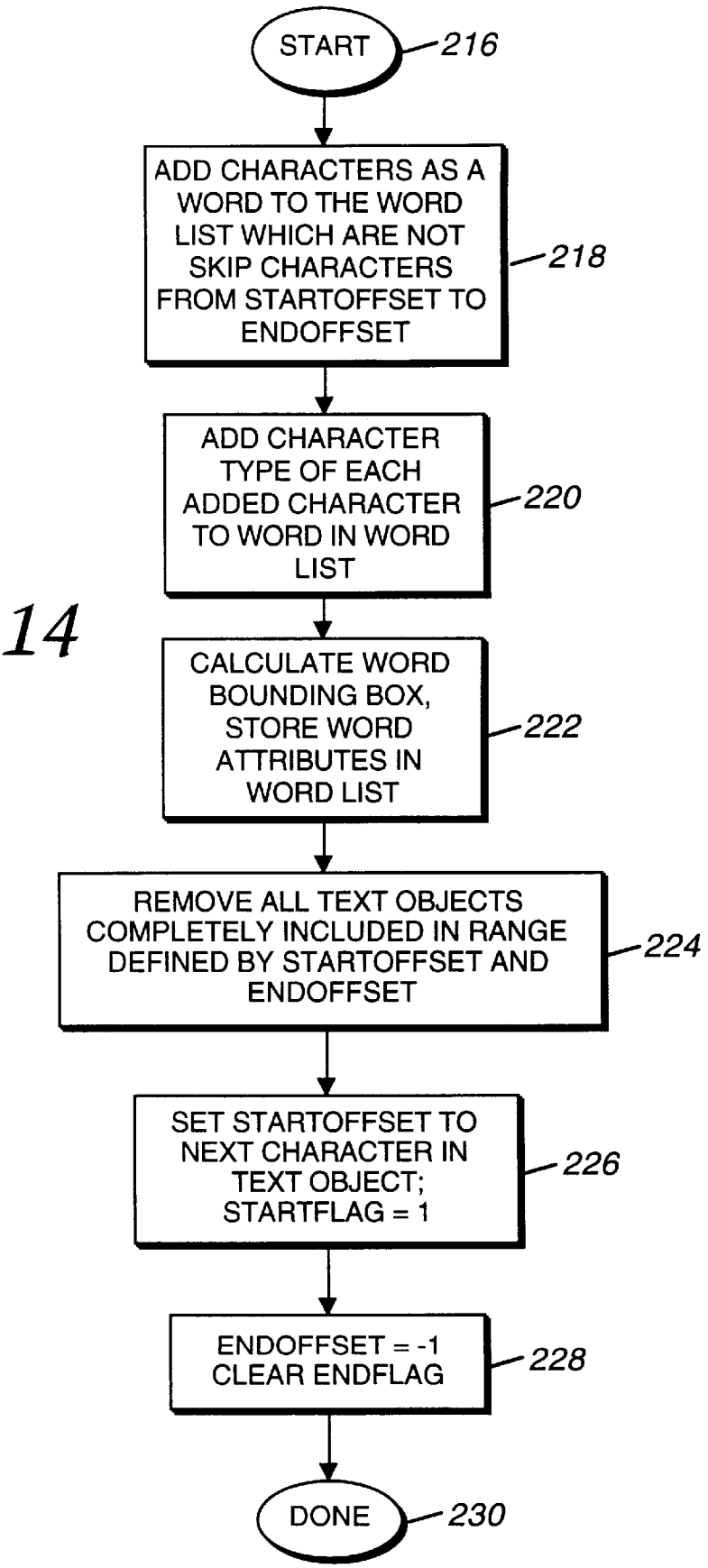
FIG. 14 is a flow diagram illustrating the process of adding a word to the word list from the text objects and removing one or more text objects from the linked list.

FIG. 14 is a flow diagram illustrating the process of adding a word to the word list from the text objects and removing one or more text objects from the linked list. This process is implemented in steps 164 and 172 of FIG. 11, and in step 213 of FIG. 13. The process begins at 216, and, in step 218, the characters between a range of offsets are added to as a word to the word list. The start of the range is defined by STARTOFFSET of the text object in the linked list which has the STARTFLAG set to 1. The end of the range is defined by the ENDOFFSET of the text object in the linked list which has the ENDFLAG set to 1. Characters that are "skip characters" are not added to the word list.

In step 220, the character type of each character is added to the word list. In the described embodiment, the character type of each character in a text object is stored in a field of the text object (not shown in FIG. 8*a*). For example, a 32-bit number can designate the type of the character, the skip flag for the character, and other type parameters. In next step 222, the bounding box of the word just added to the word list is calculated. The bounding box is the quadrilateral encompassing all the characters of the word. This is calculated from the coordinates of the start and end characters of the word added to the word list. Also in step 222, all the remaining word attributes are stored in the word list, such as font, color, the character number (which can be determined by keeping a counter variable, for example, in step 156 of FIG. 11), and the word number (a word number counter variable can be incremented as each word is added to the word list). If a word has several types of a single attribute, then the individual characters' attributes can be stored with the word in the word list. For example, if the first 3 characters of a 4-character word are blue, and the remaining character is red, a linked list having two nodes can be stored with the word. The first node can designate the color blue for a range of characters 0–3, and the second node can designate the color red for character 4.

In step 224, all the text objects which are completely included in the range between STARTOFFSET and ENDOFFSET are removed from the linked list. Thus, if all of a text object's characters were added to the word list, that text object is removed. If a text object includes more than one word and ENDOFFSET is set to the end of the first word in that text object, then that text object would not be removed since it is not completely included in the STARTOFFSET to ENDOFFSET range of characters.

In step 226, STARTOFFSET is set to the next character in the remaining text object, if any. Thus, if a text object is not removed because it included two words, STARTOFFSET would be set to the beginning of the second word in the text object. STARTFLAG is set to 1 to indicate that this text object includes the start of a word. In step 228, ENDOFFSET of the remaining text object (if any) is set to −1 to indicate that no ENDOFFSET position has yet been determined for the remaining text object. ENDFLAG is also cleared for the remaining text object, since it is not yet known if the end of a word is included in the remaining text object. The process is then complete as indicated in step 230.

Figure 15:
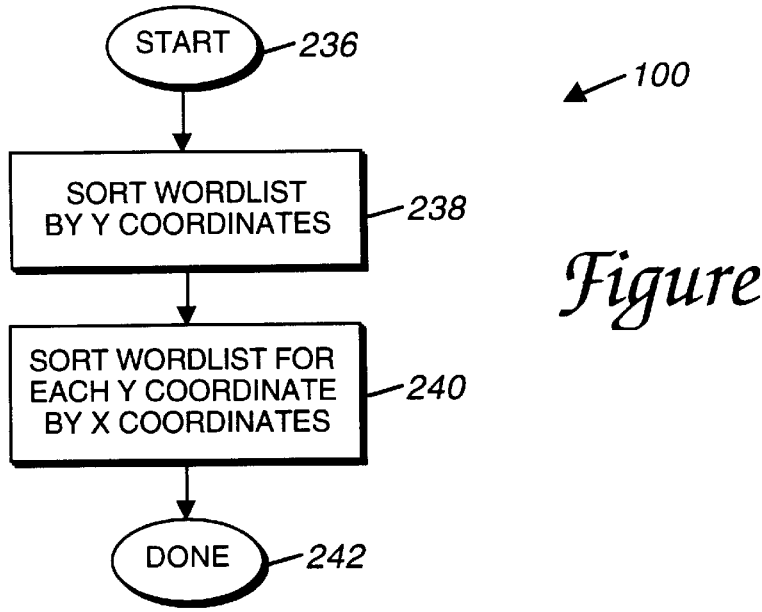
FIG. 15 is a flow diagram illustrating a step of FIG. 5 in which the words in the word list are sorted.

FIG. 15 is a flow diagram illustrating step 100 of FIG. 5, in which the words in the word list are sorted. The process begins at 236. In step 238, the words in the word list are sorted by their y coordinates so that the characters are stored in an order of ascending y coordinates. In the described embodiment, the coordinates of the lower left bounding box point of each word is used to sort the words in the word list. In next step 240, the x coordinates of the words in the word list are sorted so that the words are stored in an order of ascending x coordinates. This creates a word list having words stored and ordered in their final displayed positions according to the word coordinates. The methods of sorting are well-known to those skilled in the art. The process is then complete as indicated at 242.

Figure 16:
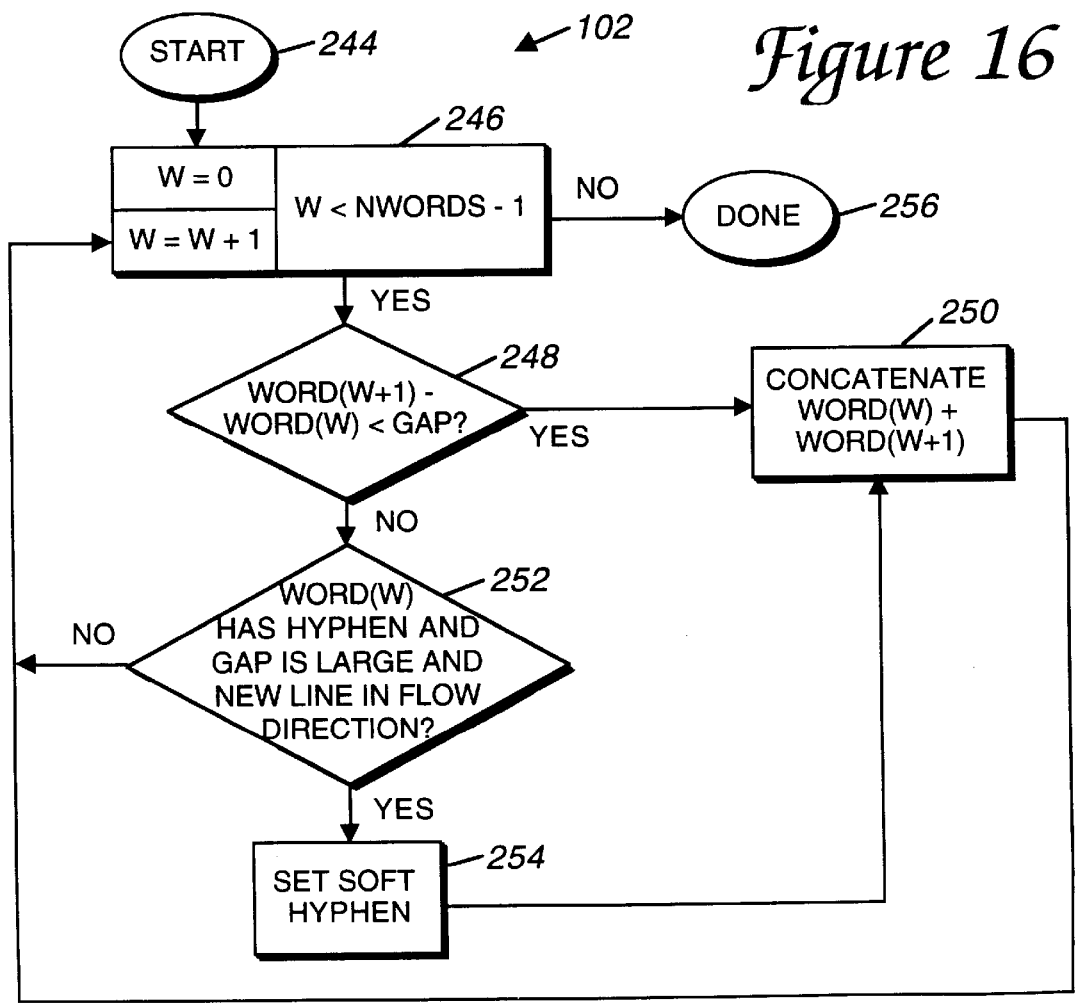
FIG. 16 is a flow diagram illustrating a step of FIG. 5 in which the word list is rebuilt.

FIG. 16 is a flow diagram illustrating step 102 of FIG. 5, in which the word list is rebuilt and put in final form to be sent to the client. Some of the words in the word list, especially if the PDF document is a scattered document, are word fragments, i.e. they are portions of a word which must be concatenated with other word fragments in the word list to form a complete word. This concatenation is considered "rebuilding" the word list. The process begins at 244. In step 246, a word variable W is initialized to zero and is compared to NWORDS−1, where NWORDS is the number of words in the word list. If W is less than NWORDS−1, then the process continues to step 248, where word(W+1)−word(W) is compared to GAP. That is, the coordinates of word(W+1) and word(W) are subtracted to determine if the words are positioned less than the gap threshold GAP, which, in the described embodiment, is ⅛ the height of the bounding box of the word(W). If the difference is less than GAP, then the two words are positioned close enough together to constitute a single word, and the word(W+1) and word (W) are concatenated in step 250. The process then returns to step 246 to increment W.

If the difference between word(W+1) and word(W) is equal to or greater than GAP, then step 252 is implemented, in which the microprocessor determines if word(W) includes a hyphen, if the gap between word(W) and word(W+1) is large, and if word(W+1) is on a new line in the flow direction. The flow direction of a word is determined by looking at its bounding box coordinates; if the lower right point is greater than the lower left point, it is left-to-right; if the lower right point is greater than the lower left point it is right-to-left; etc. If these conditions are true, then the soft hyphen flag for the hyphen character is set in step 254 (which was not set previously if the PDF was found to be a scattered document, i.e. if the sort flag was set) and word (W+l) and word(W) are concatenated in step 250. The process then returns to step 246 to increment W. If the conditions are not true, then the process returns to step 246.

Once W has been incremented to a value equal to or less than the value of NWORDS−1, then all the words in the word list have been examined for concatenation, and the process is complete as indicated at 256.

While this invention has been described in terms of several preferred embodiments, it is contemplated that alterations, modifications and permutations thereof will become apparent to those skilled in the art upon a reading of the specification and study of the drawings. For example, the present invention is described as being used for portable electronic documents, such as PDF documents. However, other files or collections of data which include codes for characters or other objects as well as other display information for those objects, such as positional information, can be processed to identify words by the present invention. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for identifying words in a document comprising:
   (a) retrieving a text segment including its x,y position from a portable electronic document that has a page including a plurality of characters that have been identified as characters but not identified as words and a plurality of text segments and associated position data;
   (b) creating a text object from each text segment and entering the text object into a linked list of text objects;
   (c) identifying words from the linked list by analyzing the text object for word breaks and by analyzing a gap between the text object with a prior text object using the associated position data;
   (d) adding identified words to a word list; and
   (e) repeating steps (a) to (e) until the end of the page is reached.

2. A method as recited in claim 1 wherein the x, y position is stored in the object associated with the text segment.

3. A method as recited in claim 1 wherein said step of creating a text object includes reassigning encoded characters of said text segments utilizing a re-assignment table and storing said reassigned characters in said text object.

4. A method as recited in claim 1 wherein said word is identified by finding a word break character in a text object.

5. A method as recited in claim 1 wherein said word is identified by finding a gap having a size greater than a threshold size between adjacent text objects.

6. A computer program product for programming a data processing apparatus to identify words on a page of a portable electronic document, comprising instructions to:
   read from the portable electronic document a description of the intended appearance of a page of the document when rendered, the description including text segments having one or more characters to be rendered on the pages each text segment associated with position information on the page, the position information of the text segments defining a display order that is independent of a storage order of the text segments;
   using the position information of the text segments to distinguish characters that are part of the same word from characters that are not part of the same word; and
   collect characters that are part of the same word.

7. The product of claim 6, wherein the instructions to collect the characters into words comprise instructions to:
   identify words having characters in the text segment by using the position information of the text segment to compute the positions of text segment characters on the page.

8. The product of claim 6, wherein the instructions to use the position information comprise instructions to:
   identify as words closely-spaced characters having a gap between them of less than a predetermined threshold; and
   store identified words in a word list.

9. The product of claim 6, wherein the instructions to use the position information comprise instructions to:
   find a word break character; and
   identify words based on the position of the word break character.

10. A system for identifying words in a page of a portable electronic document, comprising:
    a data processing apparatus operable to store a page of a portable electronic document as a file including a plurality of characters that have not been identified as words, wherein each character is at least part of a text segment that has associated position information indicating where the text segment is to be displayed; and
    a word identifying program implemented on the data processing apparatus for analyzing the text segments together with their position data to distinguish characters that are part of the same word from characters that are not part of the same word to create a list of words in the page.

11. A system as recited in claim 10, further comprising:
    a scattered document identification program implemented on the data processing apparatus for determining whether the page includes scattered characters, the word identifying program performing the analyzing if the page includes scattered characters.

12. A system for identifying words as recited in claim 10, wherein each text segment is associated with a single display command, and wherein the position information of each text segment includes an x coordinate and y coordinate that define an x,y coordinate pair indicating where the text segment is to be displayed.

13. A system for identifying words as recited in claim 10, wherein the word identifying program further comprises scattered document identification means and sorting means for sorting the word list if the scattered document identification means determines that the page requires sorting.

14. A system for identifying words as recited in claim 13, wherein each word in the word list has an associated x coordinate and y coordinate that define an x,y coordinate pair indicating where the word is to be displayed on a displayed page, and wherein the sorting means sorts the words in said word list first by the y coordinates and then by the x coordinates.

15. A system for identifying words as recited in claims 10, wherein the word identifying program stores a text segment as a text object in a linked list of text objects.

16. A system for identifying words as recited in claim 15, wherein associated information describing the text segment, including x,y coordinate pair information, is stored in the text object.

17. A system for identifying words as recited in claim 16, wherein the word identifying program concatenates words in the word list that are positioned within a threshold distance of each other and words that include a hyphen character at the end of the word.

18. A system for identifying words as recited in claim 17, wherein each text object has an associated bounding box, wherein each text object indicates whether it is a rotated text object, and wherein at least portions of adjacent rotated text objects are added as a word to the word list by the word identifying program when their bounding boxes intersect or are separated by less than a predetermined gap.

19. A system for identifying words as recited in claim 18, wherein the word identifying program identifies a word by finding a word break character in the text objects.

20. A system for identifying words as recited in claim 19, wherein the word identifying program identifies a word by finding a gap having a size greater than a threshold size between adjacent text objects.

21. A system for identifying words as recited in claim 20, wherein the word identifying program detects the gap by analyzing the spatial distance between adjacent text objects in the linked list by utilizing coordinates of the text segments stored in the text objects.

22. A system for identifying words as recited in claim 21, wherein the word identifying program adds at least a portion of adjacent text objects as a word to the word list when the gap between the adjacent text objects is below the threshold size.

* * * * *